United States Patent
Pampus et al.

(10) Patent No.: US 8,487,782 B2
(45) Date of Patent: Jul. 16, 2013

(54) METHOD FOR DETECTING OBJECTS HAVING A LOW HEIGHT

(75) Inventors: Christian Pampus, Leonberg (DE); Werner Urban, Vaihingen/Enz (DE); Meike Fehse, Ditzingen (DE); Bjoern Herder, Stuttgart (DE); Marco Knoblauch, Muehlacker (DE); Soenke Seifarth, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 314 days.

(21) Appl. No.: 12/914,057

(22) Filed: Oct. 28, 2010

(65) Prior Publication Data

US 2011/0121994 A1    May 26, 2011

(30) Foreign Application Priority Data

Oct. 29, 2009   (DE) .......................... 10 2009 046 158

(51) Int. Cl.
*B60Q 1/48* (2006.01)

(52) U.S. Cl.
USPC ......... 340/932.2; 340/435; 340/436; 340/437

(58) Field of Classification Search
USPC .............. 340/932.2, 903, 904, 933, 935, 937, 340/938, 435, 436, 437, 438; 701/301
See application file for complete search history.

(56) References Cited

U.S. PATENT DOCUMENTS

| 5,574,426 | A | 11/1996 | Shisgal et al. |
| 5,701,122 | A * | 12/1997 | Canedy ...................... 340/932.2 |
| 7,492,282 | B2 * | 2/2009 | Danz et al. ................. 340/932.2 |
| 8,244,457 | B2 * | 8/2012 | Milark et al. ................. 701/301 |
| 2003/0122687 | A1 | 7/2003 | Trajkovic et al. |
| 2007/0088474 | A1 | 4/2007 | Sugiura et al. |
| 2011/0057813 | A1 * | 3/2011 | Toledo et al. .............. 340/932.2 |

FOREIGN PATENT DOCUMENTS

| DE | 10 2007 035 219 | 1/2009 |
| DE | 10 2007 042 220 | 3/2009 |
| DE | 10 2009 016 562 | 11/2009 |
| EP | 1 643 271 | 4/2006 |
| WO | WO 2005/032916 | 4/2005 |
| WO | WO 2008/102735 | 8/2008 |

* cited by examiner

*Primary Examiner* — Toan N Pham
(74) *Attorney, Agent, or Firm* — Kenyon & Kenyon LLP

(57) ABSTRACT

A method for detecting objects having a low height, using a system for obstacle detection in vehicles, the system for obstacle detection including distance sensors for ascertaining the distance from objects and an arrangement for evaluation. The method includes performing the following: (a) continually recording the distance from an object using the distance sensors or recording the distance from an object at specified intervals, (b) checking whether the object continues to be recorded by the distance sensors when approaching the vehicle, in response to falling below a specified distance, or whether it vanishes from the detection range of the distance sensors, (c) detecting the object, which vanishes from the detection range of the distance sensors, as being an object of low height. Also described is a method for supporting a driver during a driving maneuver.

10 Claims, 2 Drawing Sheets

METHOD FOR DETECTING OBJECTS HAVING A LOW HEIGHT

FIELD OF THE INVENTION

The present invention relates to a method for detecting objects having a low height, using a system for obstacle detection in vehicles, the system for obstacle detection including distance sensors for ascertaining the distance from objects and means for evaluation. The present invention also relates to a method for supporting a driver of a vehicle during a driving maneuver.

BACKGROUND INFORMATION

There are various driver assistance systems for supporting a driver of a vehicle during different driving maneuvers. So-called parking assistance systems, which support the driver of the vehicle during parking, have become particularly successful. These support the driver of the vehicle to the extent that, in response to the approach to obstacles, an acoustical and/or optical warning takes place. For this purpose, parking assistance systems generally have distance sensors which are situated in the front region and in the rear section of the vehicle. Ultrasonic sensors are used as distance sensors, for example.

In order to record the surroundings of the vehicle, and therewith the distance from obstacles, the ultrasonic sensors each emit an acoustical pulse and receive the echo of the acoustical pulse. From the running time between emitting the signal and receiving the echo, the distance from an object reflecting the sound is calculated. This distance is usually shown to the driver via a color-coded optical display, for instance by a plurality of LED's having a different size and/or color, or acoustically by an interval tone having a certain frequency and/or intensity. Combinations of optical and acoustical indications are also customary. During an acoustical representation, the frequency of the interval tone and, if necessary, simultaneously the volume usually increase with decreasing distance from the obstacle. When a distance range that is critical for vehicle navigation is undershot, a stop warning to the driver takes place as a rule in the form of a continuous tone.

When ultrasonic sensors are used, the signal is sent in the form of a so-called sonic cone, which comes about from the transmission angle of the signal. However, because of the sonic cone, low obstacles such as flower tubs cannot be seen at every distance, since, with decreasing distance, they move into the shadow of the ultrasound. Particularly in the case of high sensor installation positions, low objects may dive through under the sonic cone without getting into the full warning range, and thus without generating a stop warning.

One system for obstacle detection is discussed in U.S. Pat. No. 5,574,426, for example.

Besides flower tubs and other similar objects, curbs are also detected as obstacles. But they usually do not represent a direct obstacle, because one may drive over them without their causing damage to the vehicle. However, in the case of parallel parking spaces, since the lateral boundary is usually formed by curbs, in parking assistance systems, which support the driver during parking in such spaces, it is necessary to detect the curb as a lateral boundary.

In semiautomatic or fully automatic parking assistance systems, in which the parking space is first measured while driving past, a parking trajectory corresponding to the parking space geometry is calculated, and steering instructions for driving into the parking space are given to the driver, or steering interventions are taken over fully automatically, a curb, which represents a low boundary, is recorded as a boundary of the parking space. In the known systems, low and high boundaries are evaluated equally, and the parking trajectory is calculated so that driving over the boundary does not occur. In the case of a low boundary, for instance a curb, whose height is so low that the vehicle is able to tower over it, the trajectory could, however, be calculated differently, since no collision is produced by driving over the low boundary. In the known systems, since the height of a bounding object is not taken into consideration, the optimal parking trajectory therefore cannot be calculated in the known systems for parking spaces having low boundaries. In addition, in a parking space having a low boundary, for instance, a curb, the vehicle is able to be parked closer to the boundary.

SUMMARY OF THE INVENTION

The method according to the present invention, for detecting objects having a low height, using a system for obstacle detection in vehicles, the system for obstacle detection including distance sensors for ascertaining the distance from objects and means for evaluation, includes the following steps:
  (a) continuous recording of the distance from an object using the distance sensors or recording the distance from an object at specified intervals,
  (b) checking whether the object continues to be recorded by the distance sensors when approaching the vehicle in response to falling below a specified distance, or whether it vanishes from the detection range of the distance sensors,
  (c) detecting the object, which vanishes from the detection range of the distance sensors, as being an object of low height.

Because of the method according to the present invention, objects which vanish from the detection range of the distance sensors during the approach, are recorded as objects having low height. By contrast to systems known from the related art, this avoids that the object vanishes, both from the detection range and from the range for the driver. The driver is able to be warned concerning the approach to an object having a low height.

In order to check whether the object vanishes from the detection range of the distance sensors upon approaching the vehicle, in each case may be at least two successive measurements for recording the distance from an object are compared to one another. In order to be able to compare at least two successive measurements, for recording the distance from an object, to one another, in each case the currently recorded data are filed in a memory after the comparison to the previously recorded data. During a subsequent measurement, the data recorded using the subsequent measurement may then be compared to the data filed in the memory. The filed data may overwrite the previously filed data in each case, in this context, because the latter do not have to be accessed any more when only two successive measurements are compared to each other. If more than two successive measurements are compared to one another, it is possible, for instance, to store the time of recording, in each case together with the data recorded. In this case, too, the data may then in each case be overwritten with the newly recorded data, the oldest data in each case being overwritten with the newly recorded data. By giving the time of recording, one is thus able to achieve an unequivocal assignment of the respectively stored data. Alternatively, instead of the time of the recording, one may also store, for instance, a sequential number or any other identifier, so as to be able to assign the recorded and stored data to a specific measurement.

However, in order to check whether, an object vanishes from the detection range of the distance sensors, upon approaching the vehicle, the comparison of two successive measurements is generally sufficient, so that, to compare two successive measurements, in each case data of at least the measurement directly preceding the current measurement are stored.

As the distance sensors, using which the distance from objects is able to be ascertained, one may use ultrasonic sensors, radar sensors, infrared sensors, capacitive sensors or LIDAR sensors, for example. The sensors in this context are the sensors usually used in systems already known, for parking support.

When an object vanishes from the detection range, one may assume that it is an object having a low height, it not being excluded that the vehicle, upon further approaching the object, could collide with it or get on top of the object. For this reason, a warning may be given to the driver of the vehicle, or the vehicle is automatically stopped, as soon as the object vanishes from the detection range. The warning given to the driver in this instance is, for example, the same warning that is also given when a minimum distance from an object, that has a greater height, is given. The warning, in this context, may take place at the instant at which the object vanishes from the detection range. However, this leads to the warning being given at a greater distance than the minimum distance in response to an object having a greater height.

The method for supporting the driver of a vehicle in a driving maneuver includes the following steps:
(i) recording the lateral surroundings of the vehicle during its driving past and ascertaining whether a suitable parking space is present,
(ii) calculating a parking trajectory into the parking space, the parking trajectory being calculated in such a way that a sufficiently great distance will be maintained from a detected lateral boundary, and guiding the vehicle along the parking trajectory into the parking space by automatic steering of the vehicle or by transmitting steering instructions to the driver of the vehicle,
(iii) recording the surroundings of the vehicle during parking,
(iv) calculating a corrected parking trajectory, which permits driving over the lateral boundary if the lateral boundary has a height that makes admissible driving over it with car body components.

According to the exemplary embodiments and/or exemplary methods of the present invention, the recording of the surroundings of the vehicle takes place during parking while using the abovementioned method for detecting objects having low height.

Because of the use of the method for detecting objects having a low height, it is possible to enable optimal guidance of the vehicle into the parking space. Thus, it is possible, for instance, to park in a shorter parking space in one go, if it is permitted to drive over a lateral boundary, such as a curb. If the lateral boundary is formed by a high object, such as a wall, the parking trajectory has to be calculated in such a way that no edge of the vehicle collides with the object. Driving over it is not possible in this case. Compared to the known systems, this has the advantage that it is not necessary always to regard the lateral boundary of the parking space as a high object, such as a wall, and to provide a correspondingly large safety distance from the lateral boundary of the parking space.

The driving maneuver in which the driver of the vehicle is supported, is generally a parking maneuver into a parking space, which may be a parking maneuver into a parallel parking space.

Since driving over an object having a low height is possible only up to a certain height of the object, without damaging the vehicle, such as, for instance, the vehicle sitting on top of the object, it is necessary also to determine the height of the object, besides the distance from the object having the low height. For this purpose, it is possible, for instance, to specify the height of the object having a low height, for instance of the lateral boundary of a parallel parking space that permits driving over it with car body components, by the distance at which the object vanishes from the detection range of the distance sensor. The detection range of the distance sensor, for instance, of an ultrasonic sensor, is specified by the sonic cone transmitted by the sensor. An object having a certain height enters into the recording range of the sensor only when it is at a certain distance away. Because of the distance at which the object vanishes from the recording range of the sensor, one is thus able to determine the height of the object unequivocally. When the distance from the object falls below a minimum distance, the detected object having a low height has a height such that driving over it safely is no longer possible. In the case of a distance that is greater than a specified minimum distance at which the object vanishes from the recording range, the height of the object is so low that it is possible safely to drive over it.

Usually, a parking space is bounded laterally by a curb. It is, however, also possible that the lateral boundary is formed by other low objects, such as chains or posts. The object having a low height may be identified as a curb, if, during a slantwise drive toward the object, distance sensors farther away from the object still detect the object, and distance sensors at a lesser distance from the object no longer record the object. Because of the recording by sensors that are at a greater distance from the object, and the recording no longer occurring, of the object by sensors closer to the object, one may conclude that an extended object is being observed. In the case of a parking space, this is usually a curb. The height of the curb may be ascertained, in this context, from the distance at which the object vanishes from the recording range of the sensors. If the curb has a height that makes driving over it safe, the parking trajectory may be calculated correspondingly.

Exemplary embodiments of the present invention are depicted in the figures and are explained in more detail in the description below.

DETAILED DESCRIPTION

Figure 1:
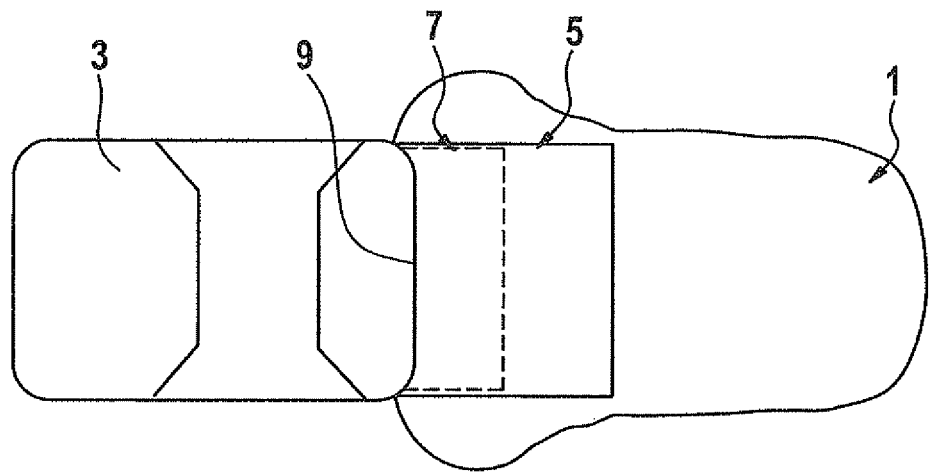
FIG. 1 shows a schematic representation of the method for detecting objects having a low height.

FIG. 1 shows schematically a method for detecting objects having a low height.

In order to detect an object having a low height, such as an object that is able to dive through under a vehicle, the vehicle being able to run over the object, two regions are defined, for example, within a detector field of view 1, for instance, a field of view of ultrasonic sensors which are mounted on a vehicle 3 as distance sensors. A first, larger region 5 is defined within detector field of view 1 so that an object having a low height is still able to be reliably detected. A second, smaller region 7 is defined so that a loss of detection of an object is expected up to a certain height. The loss of detection of the object in second region 7 is brought about by the object vanishing from the signal cone transmitted by the distance sensor, such as the sonic cone of an ultrasonic sensor.

In order to detect whether an object recorded by the distance sensors is an object having a low height, one first observes the approach of the object in first region 5. First region 5, as shown in FIG. 1, may be limited, in this context, to a certain distance from rear boundary 9 of vehicle 3. Rear boundary 9 is usually formed by a bumper, in this context. At the same time, first region 5 is also limited to a specified width. The specified width of first region 5 is, for instance, equivalent to the width of the vehicle.

Now, when an object is identified within first region 5, which the vehicle is approaching, for instance, in that the detected distance of vehicle 3 from the object has decreased by a certain minimum measure, it is observed, in a further step, whether the detection of the respective object vanishes within the second region 7, which is at a shorter distance from rear boundary 9 of the vehicle. If the object vanishes upon entering into second region 7, one will conclude that it is an object having low height, which can dive through under the vehicle. In order to be able to follow the object, it is possible, for example, in each case to file the recorded data in a memory and to compare them with the data of a subsequent measurement. For this purpose, at least two successive measurements are usually compared to one another. However, comparing more than two successive measurements is also possible. As was explained above, in this case, the measured data each, taken before have to be filed in a suitable memory. In this context, the filing of the data takes place in such a way that an unequivocal assignment to a particular measuring time is possible. In this way, the path of the object to vehicle 3 may be followed further.

If an object detected in region 5 is no longer detected in second region 7, a warning is given out, for example, to the driver of vehicle 3. In this instance, the warning may be the same as the one given out when there is an undershooting of a minimum distance from a taller object. Such a warning is, for example, the sending of a continuous tone.

Besides outputting a warning to the driver, it is alternatively also possible, if the system permits it, to stop the vehicle automatically when the object in second region 7 vanishes from the detection range of the distance sensor. This is meaningful, for instance, when the method for detecting objects of low height is used in a fully automatic parking system in which both the longitudinal guidance and the steering guidance are taken over by the system.

Figure 2:
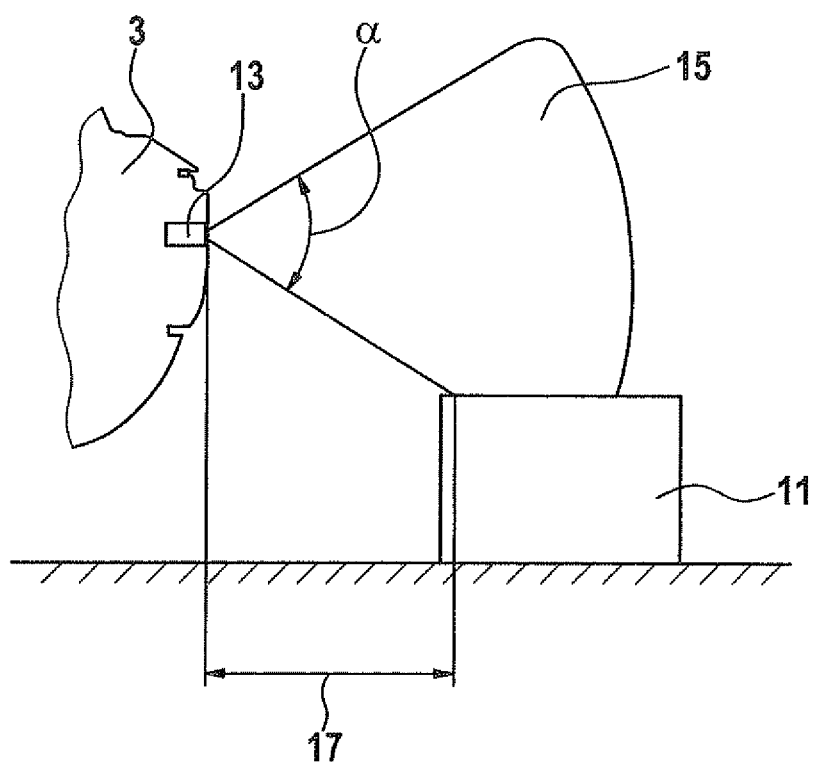
FIG. 2 shows the recording range of a sensor, at which an object having low height is able to be recorded.

In FIG. 2, the recording range of a sensor is shown, at which an object having low height is able to be recorded.

A signal is emitted by a distance sensor, such as an ultrasonic sensor 13, in order to record an object 11. The signal is reflected by object 11 and the reflected echo is received by the sensor. The emitted signal usually spreads out in the form of a sonic cone 15. Based on the spreading out of the signal in the form of sonic cone 15, an object 11, which has only a low height, is first recorded at a certain distance 17 from sensor 13. If distance 17 is undershot, object 11 having a low height no longer is located in the recording range. Depending on the height of object 11 that is to be detected and aperture angle α of sonic cone 15, distance 17, at which object 11 is no longer recorded, varies. The smaller aperture angle α is, and the lower object 11, the greater is distance 17 from sensor 13 to object 11, at which object 11 vanishes from the recording range of sensor 13. In this way, one may draw a conclusion on the height of the object from distance 17, at which object 11 vanishes from the recording range of sensor 13. In the case of objects having a specified maximum height, one may then do without warning the driver, since a safe driving over object 11 is possible. However, as soon as the maximum height of object 11 is exceeded, a warning to the driver is output, for example, so that he is able to stop the vehicle in time, in order thus to prevent a collision with object 11.

Besides recording the height of the object, if a plurality of sensors is used, which is usual in general, an object type classification may be carried out which differentiates between point-shaped objects, such as posts, and extended objects, such as walls or curbs. In the case of extended objects, one may identify in addition whether these are at a slant or directly before or behind the vehicle.

If an obstacle identified as an extended object vanishes completely, or at least on one side, from the detection range of sensor 13 during the approach of vehicle 3, that is, it is no longer detected by the sensors that are located closest to the obstacle, while the object is still being detected by sensors that are at a greater distance from the object, one may assume that it is a curb.

In particular, in the case of parking in a parallel parking space, one would drive slantwise towards an object, so that the method described above may be used.

Figure 3:
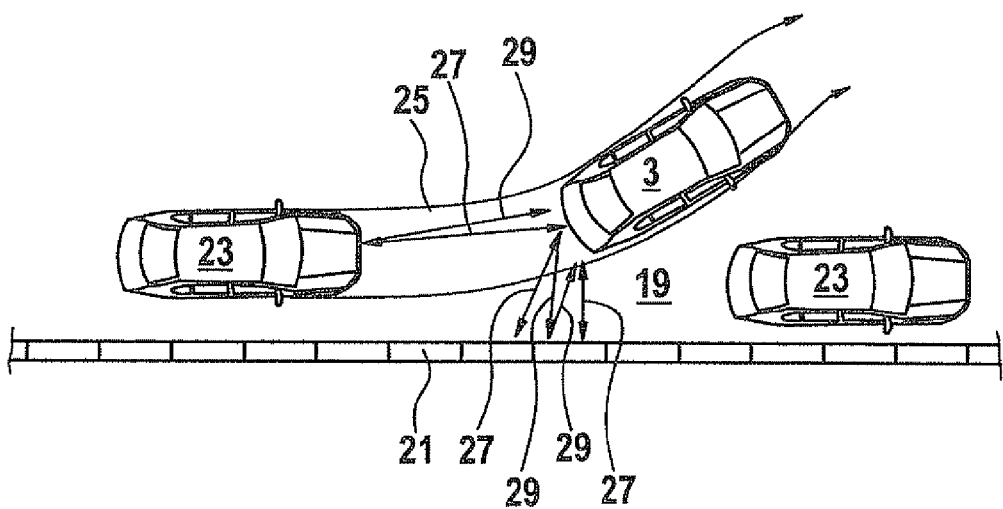
FIG. 3 shows an illustration of a parking process in a top view.

A parking process in a parallel parking space is shown in a top view in FIG. 3.

When a car is parked in a parallel parking space 19, the surroundings are recorded by sensors in the rear section of the vehicle 3 while driving in. For the recording, the individual sensors in the rear section each send out a signal and receive the echo of that signal. In addition to the signal each has sent out, the sensors are also able to receive signals sent by adjacent sensors. From the signals thus received, the surroundings of the vehicle are able to be imaged. As the objects that are recorded by the sensors, a curb 21 is also identified, beginning at a certain distance. Besides the curb, the distance sensors also record distances, for instance, from additional vehicles 23, for example, by which the parking space is bounded front and back.

Curb 21 is an object having a low height, in this context, whereas a vehicle 23 represents an object having a greater height, and which usually does not vanish from the recording range. Curb 21 generally vanishes from the recording range of the sensors as soon as a minimum distance from curb 21 has been undershot.

For calculating a suitable parking trajectory, and in order, in any case, to avoid a collision, it is first of all assumed that there is a wall as the lateral boundary of parallel parking space 19. The parking trajectory is then planned using an appropriately sufficient safety margin from such a potential wall. A travel route envelope, that comes about if the parking trajectory is planned using an appropriately great distance from the lateral boundary of parking space 19, is shown in FIG. 3 and designated by reference numeral 25.

Signals sent and received by distance sensors in the rear section of vehicle 3 are shown by arrows. Double arrows 27, in this context, denote direct echoes and single arrows 29 denote cross echoes. A signal is denoted as a direct echo, in this instance, which is sent out by the sensor and is received again by the same sensor, whereas a cross echo is a signal sent by one sensor and whose echo is received by another sensor.

Now, during the parking process, the surroundings of vehicle 3 are continuously recorded. During the parking maneuver, if lateral boundary 21, which is a curb in the specific embodiment shown here, vanishes from the recording range of the sensors, the lateral boundary is graded as being a boundary that the vehicle is able to drive over. In this case, the parking trajectory is recalculated and the parking process is continued according to the revised parking trajectory. This makes possible a closer approach to lateral boundary of the parking space. Furthermore, an additional maneuvering move for parking the vehicle may be avoided in this manner, under certain circumstances.

What is claimed is:

1. A method for detecting objects having a low height by using a system for obstacle detection in a vehicle, the method comprising:

performing one of the following: (i) continuously recording a distance from an object using distance sensors, and (ii) recording the distance from the object at specified intervals, wherein the system for obstacle detection includes the distance sensors for ascertaining the distance from objects and an evaluation arrangement;

checking whether the object continues to be recorded by the distance sensors when approaching the vehicle, in response to falling below a specified distance, or whether it vanishes from a detection range of the distance sensors; and detecting the object, which vanishes from the detection range of the distance sensors, as being an object of low height.

2. The method of claim 1, wherein to check whether the object vanishes from the detection range of the distance sensors upon approaching the vehicle, and wherein in each case at least two successive measurements for recording the distance from the object are compared to one another.

3. The method of claim 2, wherein data of at least the measurement directly preceding the current measurement are stored for comparison of two successive measurements.

4. The method of claim 1, wherein at least one of ultrasonic sensors, radar sensors, infrared sensors, capacitive sensors and LIDAR sensors are used as distance sensors.

5. The method of claim 1, wherein one of the following is satisfied: (i) a warning is given out to a driver of the vehicle, and (ii) the vehicle is automatically stopped when the object vanishes from the detection range.

6. A method for supporting a driver of a vehicle in a driving maneuver, the method comprising:

recording lateral surroundings of the vehicle during its driving past and ascertaining whether a suitable parking space is present;

determining a parking trajectory into the parking space, wherein the parking trajectory is determined so that a sufficiently great distance will be maintained from a detected lateral boundary, and guiding the vehicle along the parking trajectory into the parking space by one of automatically steering the vehicle and transmitting steering instructions to the driver of the vehicle;

recording the surroundings of the vehicle during parking, while detecting objects having a low height by using a system for obstacle detection in a vehicle, by performing the following:

performing one of the following: (i) continuously recording the distance from an object using distance sensors, and (ii) recording the distance from an object at specified intervals, wherein the system for obstacle detection includes the distance sensors for ascertaining the distance from objects and an evaluation arrangement;

checking whether the object continues to be recorded by the distance sensors when approaching the vehicle, in response to falling below a specified distance, or whether it vanishes from a detection range of the distance sensors; and detecting the object, which vanishes from the detection range of the distance sensors, as being an object of low height; and determining a corrected parking trajectory, which permits driving over the lateral boundary if the lateral boundary has a height that makes admissible driving over it with car body components.

7. The method of claim 6, wherein the driving maneuver is a parking maneuver into the parking space.

8. The method of claim 7, wherein the parking space is a parallel parking space.

9. The method of claim 6, wherein the height of the object, which permits driving over it with car body components, is specified by the distance at which the object vanishes from the detection range of the distance sensor.

10. The method of claim 6, wherein the object having the low height is identified as a curb, if, during a slantwise drive toward the object, distance sensors farther away from the object still detect the object, and distance sensors which are at a lesser distance from the object no longer record the object.

* * * * *